United States Patent [19]

Ishida et al.

[11] Patent Number: 4,534,506
[45] Date of Patent: Aug. 13, 1985

[54] THERMOPNEUMATIC MECHANISM FOR OPENING AND CLOSING A RADIATOR GRILLE

[75] Inventors: Keiichi Ishida; Junji Okumura; Fumio Agetsuma, all of Toyota, Japan

[73] Assignee: Aisin Seiki Kabushiki Kaisha, Aichi, Japan

[21] Appl. No.: 407,301

[22] Filed: Aug. 11, 1982

[30] Foreign Application Priority Data

| Aug. 13, 1981 | [JP] | Japan | 56-120343[U] |
|---|---|---|---|
| Aug. 13, 1981 | [JP] | Japan | 56-120345[U] |
| Aug. 13, 1981 | [JP] | Japan | 56-127286 |
| Aug. 13, 1981 | [JP] | Japan | 56-127287 |

[51] Int. Cl.³ .............................................. F01P 7/12
[52] U.S. Cl. ................... 236/35.3; 123/41.05; 123/41.06
[58] Field of Search .............. 236/35, 35.2, 35.3, 236/86, 87, 101 C; 165/42, 43; 123/41.04, 41.11, 41.05, 41.06; 91/419

[56] References Cited

U.S. PATENT DOCUMENTS

| 1,522,137 | 1/1925 | McCaleb | 236/35.2 |
|---|---|---|---|
| 1,925,351 | 9/1933 | Twombly | 123/41.06 |
| 2,638,881 | 5/1953 | Pankuch et al. | 236/35.2 |
| 2,645,212 | 7/1953 | Bogaards | 123/41.06 |
| 3,064,632 | 11/1962 | Frank . | |
| 3,313,485 | 4/1967 | Harvey | 236/86 |
| 3,377,022 | 4/1968 | Beatenbough et al. | 236/86 |
| 3,777,808 | 12/1973 | Izumi | 236/35.2 X |
| 3,841,551 | 10/1974 | Ota | 236/86 |
| 3,871,497 | 3/1975 | Bessiere | 91/6 X |
| 4,181,106 | 1/1980 | Brakebill | 236/87 |
| 4,241,873 | 12/1980 | Satomoto | 236/87 |

FOREIGN PATENT DOCUMENTS

| 2368607 | 5/1978 | France | 236/35.2 |
|---|---|---|---|
| 288303 | 5/1953 | Switzerland | 123/41.06 |
| 811900 | 4/1959 | United Kingdom | 123/41.06 |

OTHER PUBLICATIONS

Kysor Shutters and Controls, Parts and Service Catalog, Kysor of Cadillac—Cadillac, Michigan 49601, Nov. 1968.

Primary Examiner—Michael Koczo
Attorney, Agent, or Firm—Finnegan, Henderson, Farabow, Garrett and Dunner

[57] ABSTRACT

A radiator grille actuating mechanism for use on an automobile having a body and utilizing an engine coolant, comprises a radiator grille pivotably mounted on the automobile body, a link mechanism operatively connected to said radiator grille and pivotably mounted on the automobile body, an actuator mounted on the automobile body and operatively connected to the link mechanism for moving the radiator grille between open and closed positions through the link mechanism, and means for actuating the actuator to move the radiator grille between the open position and the closed position in response to sensing of a predetermined temperature of the engine coolant. The radiator grille can be brought to the open position when the engine coolant reaches the predetermined temperature, thus allowing a sufficient amount of air to be supplied to the radiator to prevent the engine from being overheated. The actuating means may comprise a vacuum actuator controllably supplied with a vacuum as from an intake manifold, or a solenoid-operated actuator controlled by an electrical circuit which issues an actuating signal only when the temperature of the engine coolant is detected and the speed of travel of the automobile drops below a predetermined speed.

1 Claim, 6 Drawing Figures

THERMOPNEUMATIC MECHANISM FOR OPENING AND CLOSING A RADIATOR GRILLE

BACKGROUND OF THE INVENTION

The present invention relates to a mechanism for opening and closing a radiator grille for use on automobiles.

Engine cooling systems on automobiles primarily utilize a cooling liquid or coolant that circulates to cool the engine cylinders, thereby preventing the engine from being overheated during operation. The coolant is heated by the engine cylinders after cooling the engine and then flows to a radiator in which the coolant is cooled by air passing through the radiator. The radiator is covered by a radiator grille which provides a sufficient supply of air to the radiator and prevents the radiator from radiating enough heat particularly when the coolant is overheated, resulting in overheating of the engine cylinders. In order to gain greater heat dissipation at the radiator, it is necessary that the radiator be constructed for fully opening the radiator grille to allow an increased amount of air to be supplied to the radiator. However, the fully opened radiator grille permits an uncontrolled influx of air that tends to cool the coolant excessively, reduce the capability of the car heater especially during the winter, and to increase the coefficient of air resistance while the car is running at high speeds.

SUMMARY OF THE INVENTION

It is an object of the present invention to provide a mechanism for automatically opening and closing a radiator grille to allow a desired amount of air to be supplied to the radiator at all times.

Another object of the present invention is to provide a mechanism for automatically opening a radiator grille when the temperature of an engine coolant reaches a predetermined value to thereby supply a sufficient amount of air needed for the coolant to be cooled.

Still another object of the present invention is to provide a mechanism for automatically opening a radiator grille when the car speed drops below a predetermined speed and the temperature of an engine coolant reaches a predetermined temperature to thereby supply a sufficient amount of air needed for the coolant to be cooled.

According to the present invention, a radiator grille actuating mechanism for use on an automobile having a body and utilizing an engine coolant comprises a radiator grille pivotably mounted on the automobile body, a link mechanism operatively connected to the radiator grille and pivotally mounted on the automobile body, an actuator mounted on the automobile body and operatively connected to the link mechanism for moving the radiator grille between open and closed positions through the link mechanism, and means for actuating the actuator to move the radiator grille between the open position and the closed position in response to sensing of a predetermined temperature of the engine coolant. With this arrangement, the radiator grille can be brought to the open position when the engine coolant reaches the predetermined temperature, thus allowing a sufficient amount of air to be supplied to the radiator to prevent the engine from being overheated. The actuating means may comprise a vacuum actuator controllably supplied with a vacuum as from an intake manifold, or a solenoid-operated actuator controlled by an electrical circuit which issues an actuating signal only when the temperature of the engine coolant is detected and the speed of travel of the automobile drops below a predetermined speed.

The above and other objects, features and advantages of the present invention will become more apparent from the following description when taken in conjunction with the accompanying drawings in which certain preferred embodiments of the present invention are shown by way of illustrative example.

DETAILED DESCRIPTION

Figure 1:
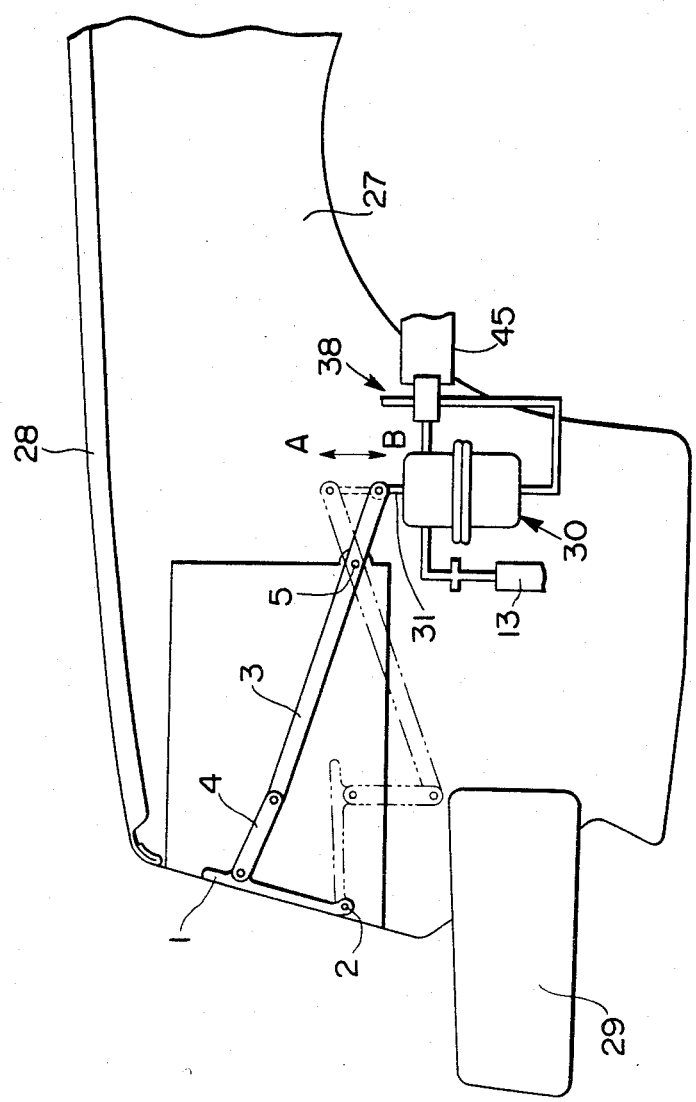
FIG. 1 is a fragmentary side elevational view of a mechanism for opening and closing a radiator grille according to a first embodiment of the present invention.

As shown in FIG. 1, a radiator grille 1 which is located in front of a radiator (not shown) has a lower end pivotably mounted by a pin 2 on an automobile body 27 and is pivotally coupled to a first link 3 by a second link 4. The first link 3 is pivotally mounted on the automobile body 27 by a pivot pin 5. The second link 4 has one end pivotally connected to the radiator grille 1 and the other end pivotally connected to one end of the first link 3. The other end of the first link 3 is pivotally coupled to a plunger 7 of a vacuum actuator 6 for actuating the radiator grille 1. The automobile body 27 includes an engine hood 28 covering the radiator and an engine, and a bumper 29 located below the radiator grille 1.

Figure 2:
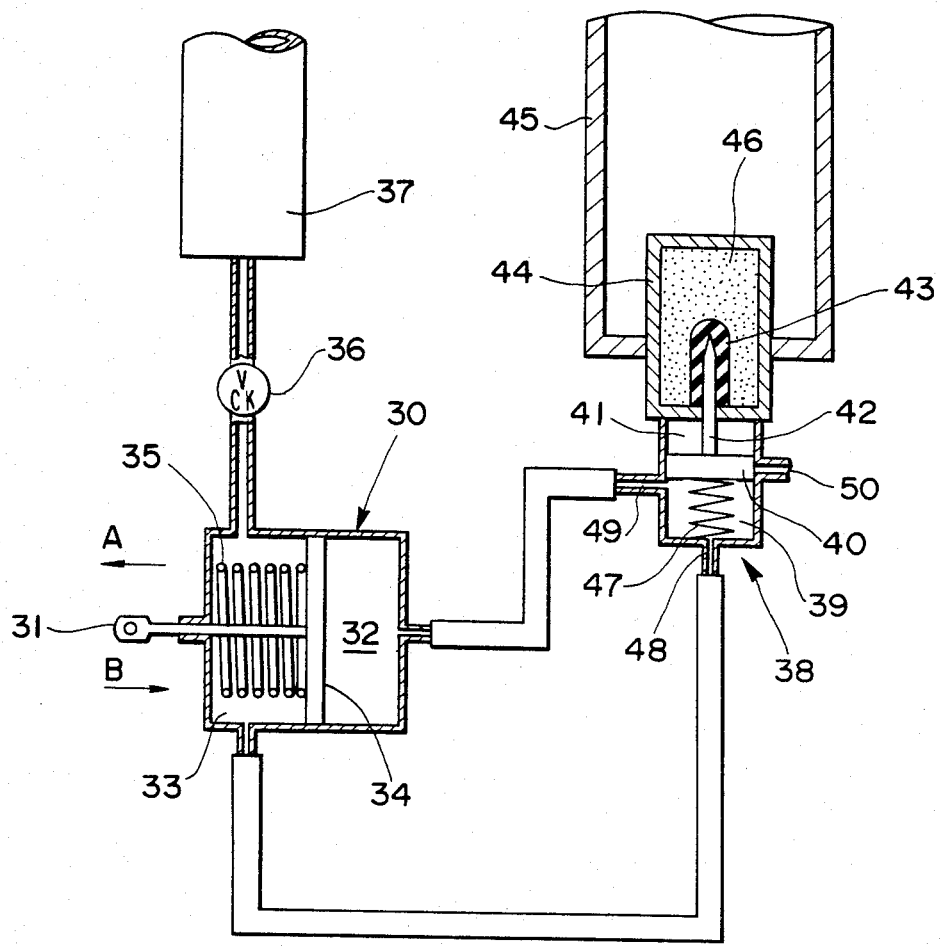
FIG. 2 is a cross-sectional view of a grille actuator and a system for controlling the grille actuator in the mechanism shown in FIG. 1.

FIGS. 1 and 2 illustrate a mechanism for opening and closing a radiator grille 1 according to a preferred embodiment of the present invention. The mechanism includes a radiator grille actuator 30 having a movable plunger 31 pivotally coupled to the first link 3 and comprising a cylinder having a pressure chamber 32 and a vacuum chamber 33 separated therefrom by a piston 34 on which the plunger 31 is mounted. The piston 34 is normally urged by a spring 35 disposed in the vacuum chamber 33 to retract the plunger 31 in the direction of the arrow B. The vacuum chamber 33 is held in fluid communication with an intake manifold 37 through a check valve 36.

A directional control valve or changeover switch 38 comprises a first chamber 39 normally providing fluid communication between the pressure chamber 32 and the vacuum chamber 33 in the radiator grille actuator 30, and a second chamber 41 which is separated from the first chamber 39 by a piston 40 to which there is fixed a rod 42 having a wedge-shaped distal end enclosed in an elastomeric seal 43 and extending into a wax-type thermostat 44. The wax-type thermostat 44 contains a mass of wax 46 surrounding the elastomeric seal 43 and has a portion projecting into a duct 45 for contact with the engine cooling liquid or coolant. Thus, the mass of wax 46 can be melted as the temperature of the engine coolant increases.

Operation of the mechanism for opening and closing the radiator grille 1 thus constructed will be described with respect to FIGS. 1 and 2. When the temperature of the engine coolant is below a predetermined level such as 80 degrees Celsius, with the wax 46 solidified, the piston 40 is urged by a spring 47 in the first chamber 39 to the illustrated position (FIG. 2) to keep first and second ports 48, 49 in fluid communication. Thus, the vacuum supplied from the intake manifold 37 is introduced through the vacuum chamber 33 in the actuator 30 and the first chamber 39 into the pressure chamber 32, whereupon the vacuum chamber 33 and the pressure chamber 32 are equally pressurized allowing the piston 34 to retract the plunger 31 under the force from the spring 35 in the direction of the arrow B. The radiator grille 1 is now fully closed. When, on the other hand, the coolant temperature rises beyond 80 degrees Celsius, the mass of wax 46 melts and thermally expands thereby forcing the rod 42 downward in the direction of second port 48. The downward movement of the rod 42 and hence the piston 40 blocks fluid communication between the first and second ports 48, 49 and allows fluid communication between the second port 49 and a third port 50 which is vented to the atmosphere. The pressure chamber 32 in the actuator 30 is now supplied with atmospheric air through the third port 50, the second chamber 41 and the second port 49, causing a pressure difference between the pressure chamber 32 and the vacuum chamber 33. The piston 34 and hence the plunger 31 are then displaced in the direction of the arrow A against the resiliency of the spring 35 under the pressure in the pressure chamber 32. The displacement of the plunger 31 causes the first and second links 3, 4 (FIG. 1) to open the radiator grille 1 completely. Therefore, when the temperature of the engine coolant rises up to or beyond a certain temperature, the radiator grille 1 is opened to supply a sufficient amount of air to the radiator for permitting the air to dissipate heat from the engine coolant.

Figure 3:
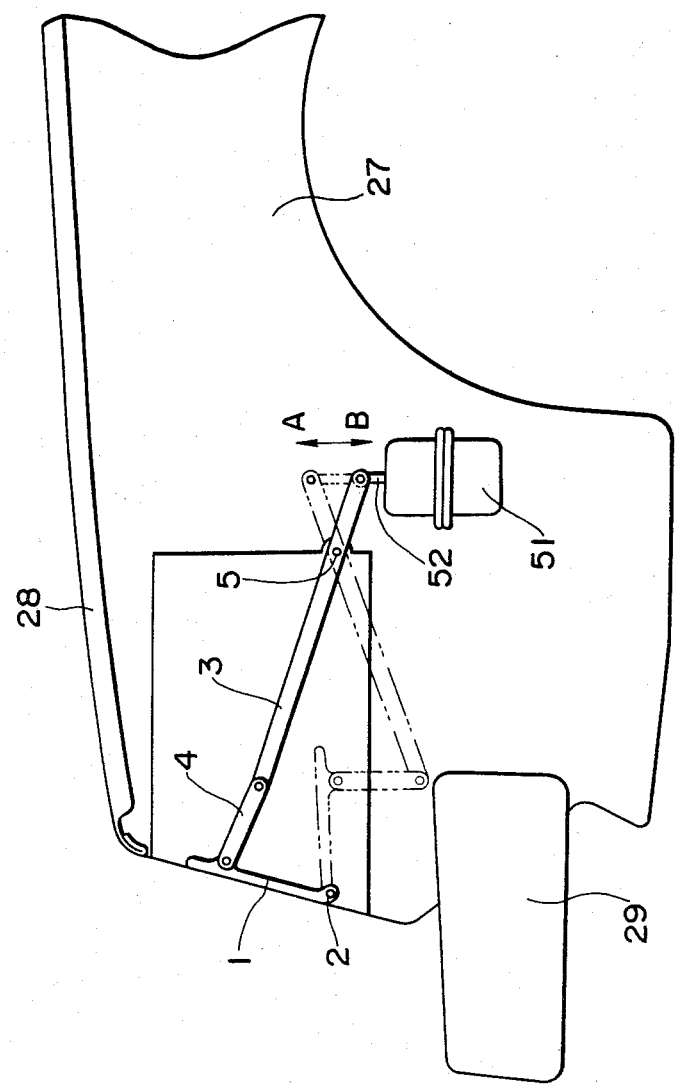
FIG. 3 is a fragmentary side elevational view of a mechanism for opening and closing a radiator grille according to a second embodiment of the present invention.
Figure 4:
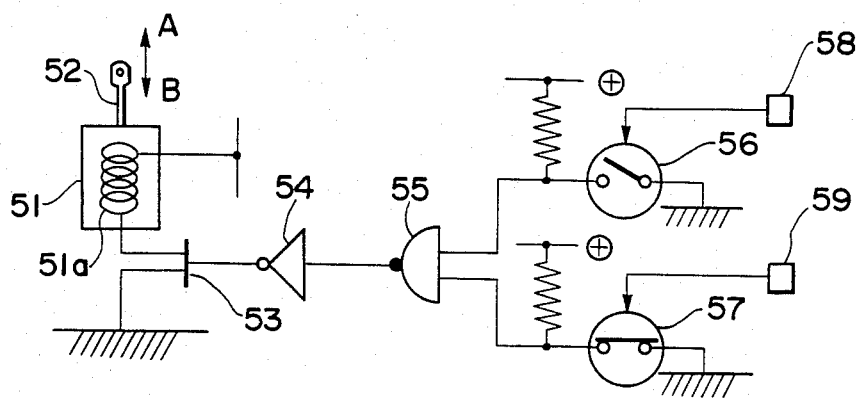
FIG. 4 is a circuit diagram of a solenoid-operated grille actuator and an electric circuit for controlling the solenoid-operated grille actuator in the mechanism illustrated in FIG. 3.

According to a second embodiment shown in FIGS. 3 and 4, the radiator grille 1 is actuated by a solenoid-operated actuator 51 having a plunger 52 which is pivotably coupled to the first link 3 that is pivotably connected to the radiator grille 1. When the solenoid-operated actuator 51 is energized to push out the plunger 52 in the direction of the arrow A, the first link 3 is turned counterclockwise in FIG. 3 about the pin 5 pulling the second link 4 downwardly, whereupon the radiator grille 1 is displaced from the fully closed position shown by the solid lines to the fully open position shown by the broken lines. Conversely, when the solenoid-operated actuator 51 is de-energized, the plunger 52 is retracted in the direction of the arrow B to turn the first link 3 clockwise about the pin 5. The second link 4 is then lifted to shift the radiator grille 1 from the fully open position up to the fully closed position. Accordingly, the radiator grille 1 can be opened in response to the energization of the solenoid-operated actuator 51.

A circuit for controlling the operation of the solenoid-operated actuator 51 will be described with reference to FIG. 4. The solenoid-operated actuator 51 has a solenoid 51a connected to a power supply and a transistor 53, the base of which is connected through an inverter 54 to the output of a NAND gate 55 having two inputs. One of the inputs of the NAND gate 55 is connected to a first switch 56 connected to a temperature sensor 58 and closable in response to a signal from the temperature sensor 58. The other input is connected to a second switch 57 coupled to a speed sensor 59 and closable in response to a signal from the speed sensor 59. The temperature sensor 58 generates a signal to close the first switch 56 when the temperature of the engine coolant reaches or exceeds a certain predetermined temperature, such as 80 degrees Celsius. The speed sensor 59 produces a signal to close the second switch 57 when the speed of the car drops below a certain speed, such as 80 km/h. The inputs of the NAND gate 55 are also coupled to a power supply.

The circuit thus constructed serves to energize the solenoid-operated actuator 51 only when the coolant temperature reaches or exceeds 80 degrees Celsius, for example, and at the same time the car speed becomes lower than 80 km/h, for example. More specifically, when both of the first and second switches 56, 57 are closed in response to signals from the temperature sensor 58 and the speed sensor 59, the signals supplied to the inputs of the NAND gate 55 go low and the NAND gate 55 produces an output signal of logic level 1, which is inverted by the inverter 54 and applied to the base of the transistor 53. The transistor 53 is then rendered conductive to thereby cause the solenoid-operated actuator 51 to be energized. The energization of the solenoid-operated actuator 51 moves the plunger 52 in the direction of the arrow A, whereupon the radiator grille 1 is opened. When the car speed becomes higher than 80 km/h or the coolant temperature drops below 80 degrees Celsius, or both, the first switch 56 or the second switch 57, or both, are opened so that at least one of the inputs of the NAND gate 55 is supplied with a signal of logic level 1. Then, the transistor 53 is rendered nonconductive to de-energize the solenoid-operated actuator 51. The plunger 52 is pulled back in the direction of the arrow B to thereby close the radiator grille 1. Therefore, as long as at least one of the first and second switches 56, 57 remains open, the radiator grille 1 remains closed. Stated otherwise, the radiator grille 1 can be opened only when the car speed is below a predetermined speed and simultaneously the coolant temperature is above a predetermined temperature. With this arrangement, there is no danger for the coefficient of air resistance at the radiator to undergo an undue increase which would otherwise result from the opening of the radiator grille while the car is running at high speeds. Additionally the coolant is prevented from being cooled excessively, while the heating capacity of the heater system is prevented from being lowered during the winter.

Figure 6:
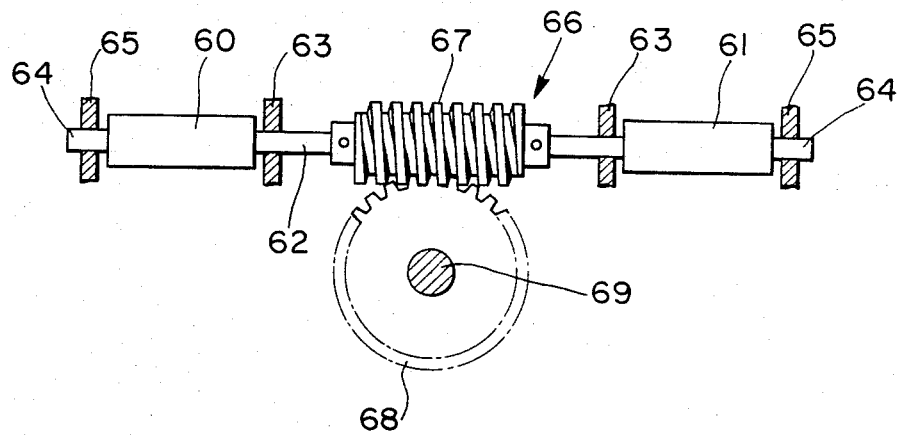
FIG. 6 is a fragmentary plan view of the mechanism shown in FIG. 5.
Figure 5:
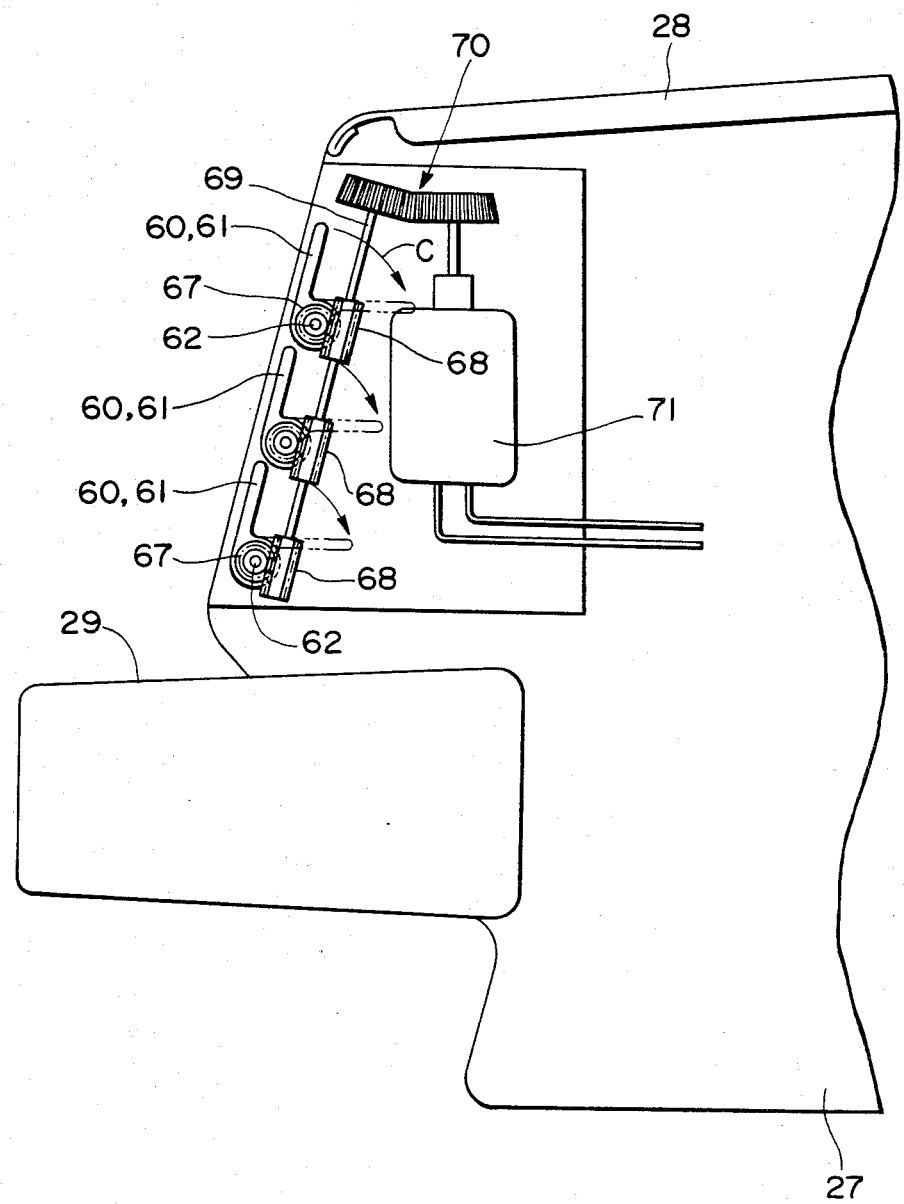
FIG. 5 is a fragmentary side elevational view of a mechanism for opening and closing a radiator grille according to a third embodiment of the present invention.

FIGS. 5 and 6 illustrate a mechanism for opening and closing radiator grilles according to a third embodiment of the present invention. As shown in FIG. 6, a pair of laterally spaced radiator grilles 60, 61 are mounted on a connector rod 62 journalled in frame members 63, 63 of an automobile body 27 (FIG. 5) and have pins 64, 64, respectively, journalled in frame members 65, 65 of the automobile body 27. As illustrated in FIG. 5, a plurality of (three in the illustrated embodiment) such pairs of radiator grilles 60, 61 are pivotably placed in front of a radiator (not illustrated) in vertically spaced relation. A plurality of (three in the illustrated embodiment) sets of skew gears 66 each include a first gear 67 mounted centrally on connector rod 62 and a second gear 68 supported on a substantially vertical drive rod 69 rotatably supported on the automobile body 27 and held in driving mesh with the first gear 67. The drive rod 69 extends substantially parallel to the radiator grilles 60, 61 when they are in the fully closed position as shown by the solid lines in FIG. 5. The skew gears 67, 68 may be in the form of crossed helical gears or a worm gear mechanism. The drive rod 69 is operatively coupled through a gear train 70 with a motor 71 which is energizable in response to a signal supplied from a temperature sensor (not shown) when the temperature of the engine coolant reaches or becomes higher than a predetermined temperature.

In operation, when the temperature of the engine coolant goes beyond the predetermined temperature, the temperature sensor issues a signal which energizes the motor 71, whereupon the drive rod 69 is rotated by the gear train 70 to cause the skew gears 66 to angularly move the radiator grilles 60, 61 simultaneously about the connector rods 62 and the pins 64 in the direction of the arrows C from the solid-line position to the broken-line position (FIG. 5). The radiator grilles 60, 61 are now fully opened to allow a sufficient amount of air to be supplied to the radiator for accelerating heat dissipation and hence preventing the engine from being overheated. The motor 71 may be controlled such that the radiator grilles 60, 61 can be stopped at a half-open position. The radiator grilles 60, 61 can be brought back to the fully closed position by reversing rotation of the motor 71.

Although certain preferred embodiments have been shown and described in detail, it should be understood that many changes and modifications may be made therein without departing from the scope of the appended claims.

What is claimed is:

1. A radiator grille actuating mechanism for use on an automobile having a body and a vacuum source, and utilizing an engine coolant, comprising:

a radiator grille pivotably mounted on the automobile body;

a link mechanism connected to said radiator grille;

an actuator, including a cylinder having a vacuum chamber, a pressure chamber and a piston slidably positioned in said cylinder between said chambers, said piston having a plunger pivotably connected to said link mechanism for opening and closing said grille by the movement of the piston, said piston being biased toward said pressure chamber for closing said grille and drawn toward said vacuum chamber against said bias for opening said grille, under application of the vacuum from said vacuum source;

means for controlling the reciprocations of said piston in said cylinder in response to changes in temperature of said engine coolant, said controlling means including changeover switch means and a temperature sensor for actuating said switch means, said switch means including means for venting said pressure chamber to atmosphere to open said grille under said bias in a first position of the switch means and means for connecting said pressure chamber to said vacuum chamber for closing said grille in a second position of said switch means, said temperature sensor comprising a wax-type thermostat having a portion extending into said engine coolant and containing a mass of wax having a fixed melting point and a rod extending into said mass of wax for moving said switch means between the first and second positions according to the expansion and contraction of said wax about said melting point.

* * * * *